(12) United States Patent
Ulrich et al.

(10) Patent No.: US 7,997,486 B2
(45) Date of Patent: Aug. 16, 2011

(54) SYSTEM, METHOD, AND APPARATUS OF RFID POINT OF SALE

(75) Inventors: Richard Bennett Ulrich, Bentonville, AR (US); Nicholaus Adam Jones, Bentonville, AR (US); Justin C. Lewis, Bentonville, AR (US); Jason Todd, Lowell, AR (US); Tim Webb, Rogers, AR (US); Ryan Cox, Saratoga Springs, UT (US)

(73) Assignee: Wal-Mart Stores, inc., Bentonville, AR (US)

( * ) Notice: Subject to any disclaimer, the term of this patent is extended or adjusted under 35 U.S.C. 154(b) by 439 days.

(21) Appl. No.: 12/197,028

(22) Filed: Aug. 22, 2008

(65) Prior Publication Data

US 2009/0101713 A1   Apr. 23, 2009

Related U.S. Application Data (60) Provisional application No. 60/957,767, filed on Aug. 24, 2007.

(51) Int. Cl.
*G06K 15/00* (2006.01)
(52) U.S. Cl. .......... 235/383; 340/568.5; 902/22; 705/23
(58) Field of Classification Search ............... 235/383; 340/568.5; 902/22; 705/23
See application file for complete search history.

(56) References Cited

U.S. PATENT DOCUMENTS

| | | | |
|---|---|---|---|
| 5,530,702 A | 6/1996 | Palmer et al. | |
| 7,387,241 B2 * | 6/2008 | Hassenbuerger | 235/383 |
| 2002/0075151 A1 | 6/2002 | Lancos et al. | |
| 2002/0174025 A1 | 11/2002 | Hind et al. | |
| 2004/0220860 A1 * | 11/2004 | Persky et al. | 705/23 |
| 2005/0167493 A1 * | 8/2005 | Barton et al. | 235/383 |
| 2005/0190060 A1 | 9/2005 | Clancy et al. | |
| 2006/0170556 A1 | 8/2006 | Fang | |
| 2006/0226990 A1 * | 10/2006 | Broad et al. | 340/573.1 |
| 2007/0034692 A1 * | 2/2007 | Johnson | 235/383 |
| 2008/0258877 A1 * | 10/2008 | Rodgers | 340/10.3 |

OTHER PUBLICATIONS

International Search Report of Application No. PCT/US08/74258, dated Nov. 17, 2008.

* cited by examiner

*Primary Examiner* — Michael G Lee
*Assistant Examiner* — Kristy A Haupt
(74) *Attorney, Agent, or Firm* — Kenyon & Kenyon LLP (57) ABSTRACT

An RFID Point-of-Sale system for completing a sale transaction to a customer of a plurality of items associated with a plurality of unique RFID tags at a store includes an arrangement of a plurality of RFID tag scanners for detecting the plurality of unique RFID tags associated with the plurality of items, and a checkout platform including a transaction panel, wherein a list of the plurality of items is displayed on the transaction panel based on a matching of the detected plurality of unique RFID tags with information stored in an inventory database.

28 Claims, 7 Drawing Sheets

SYSTEM, METHOD, AND APPARATUS OF RFID POINT OF SALE

CROSS-REFERENCE TO RELATED APPLICATIONS

This application claims priority to U.S. Provisional patent application No. 60/957,767, filed Aug. 24, 2007, entitled "Systems, Methods, and Apparatuses Using RFID Technology," which is herein incorporated by reference in its entirety.

FIELD OF THE INVENTION

The present invention relates to a system, method, and apparatus for customer checkout at a store. In particular, the present invention relates to a system, method, and apparatus of using RFID tag scanners and RFID tags to improve the customer checkout process at the store.

BACKGROUND INFORMATION

Figure 1:
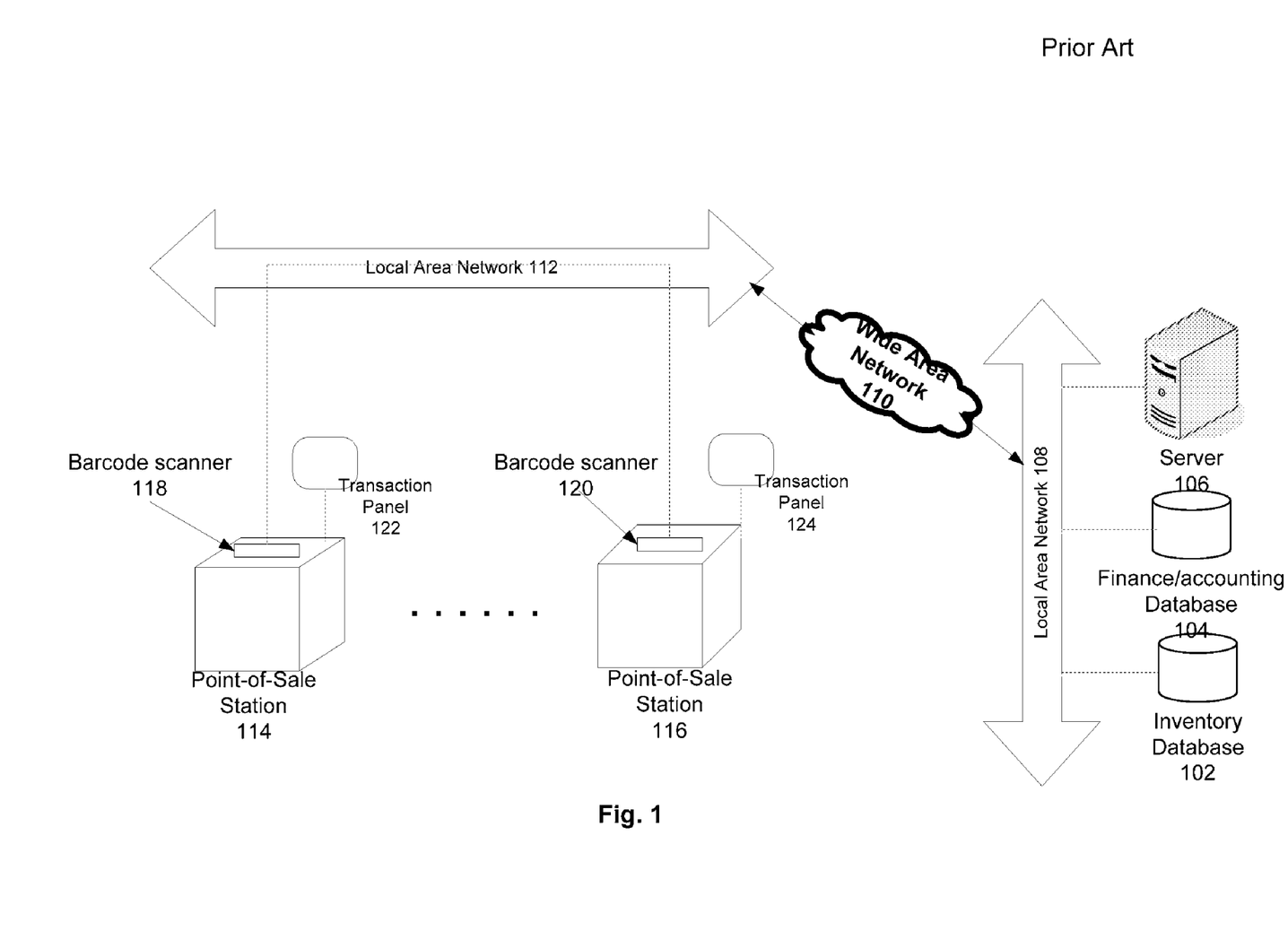
FIG. 1 shows an example of a conventional barcode-based point-of-sale (POS) system.

A store, e.g., a Wal-Mart Store, may manage its inventories using certain coding systems, e.g., conventional barcode systems, and point of sale (POS) stations. FIG. 1 illustrates a typical barcode and POS system used in retail stores. In such a system, inventories may be encoded with barcodes and stored in an inventory database 102 at a centralized location, e.g., a headquarter, before or upon their arrival at the store. The database 102 may be connected to a server computer 106 through a first local area network 108 (LAN). The server computer 106 may manage transactions between the inventory database 102 with other functionalities, e.g., a financial/accounting database 104. The LAN 108 in the headquarter may be linked through a wide area network (WAN) 110 to, e.g., a LAN 112 at a store. For a chain of stores, e.g., Wal-Mart Stores, the server computer 106 at the headquarter may be linked to multiple stores. In some situations, the server computer 106 and databases 102, 104 may be located locally at the store.

Within each store, multiple checkout counters or POS stations 114, 116 may be set up at different locations for customers to conduct purchase transactions. These POS stations 114, 116 may be linked through the LAN 112 and WAN 110 to the server computer 106, and databases 102, 104. Additionally, POS stations 114, 116 may be configured with barcode scanners 118, 120, and transaction panels 122, 124. A customer may bring merchandise that he wants to purchase to a POS station for a transaction. The merchandise may have been labeled or attached with barcodes. A cashier may scan each item using barcode scanners 118, 120 to generate a list of pending purchase orders and corresponding prices for the customer. The customer may agree to and complete the purchase by paying with, e.g., cash or a check, or with credit, e.g., using a credit/debit card. Once a product is sold to the customer, the product may be removed from the inventory based on the barcode scan at a checkout counter and the transaction at the POS station. The inventory database 102 and accounting database 104 may then be updated accordingly.

The traditional barcode-based POS system requires the scanning of each item to be purchased by a cashier, which may be time-consuming and require human resources that may be deployed for other purposes, e.g., customer services. Streamlining customer transactions at POS stations may increase customer satisfactions and store efficiencies.

RFID recently emerged as a technology of choice for store inventory management. For example, U.S. patent application, entitled "RFID Promotional Compliance", filed on even date, by Richard Ulrich (incorporated herein by reference), describes a method of managing promotional merchandise displays using RFID tags. In such a system, RFID tags may be placed on products for uniquely identifying individual products in an RFID inventory database.

SUMMARY

Figure 2:
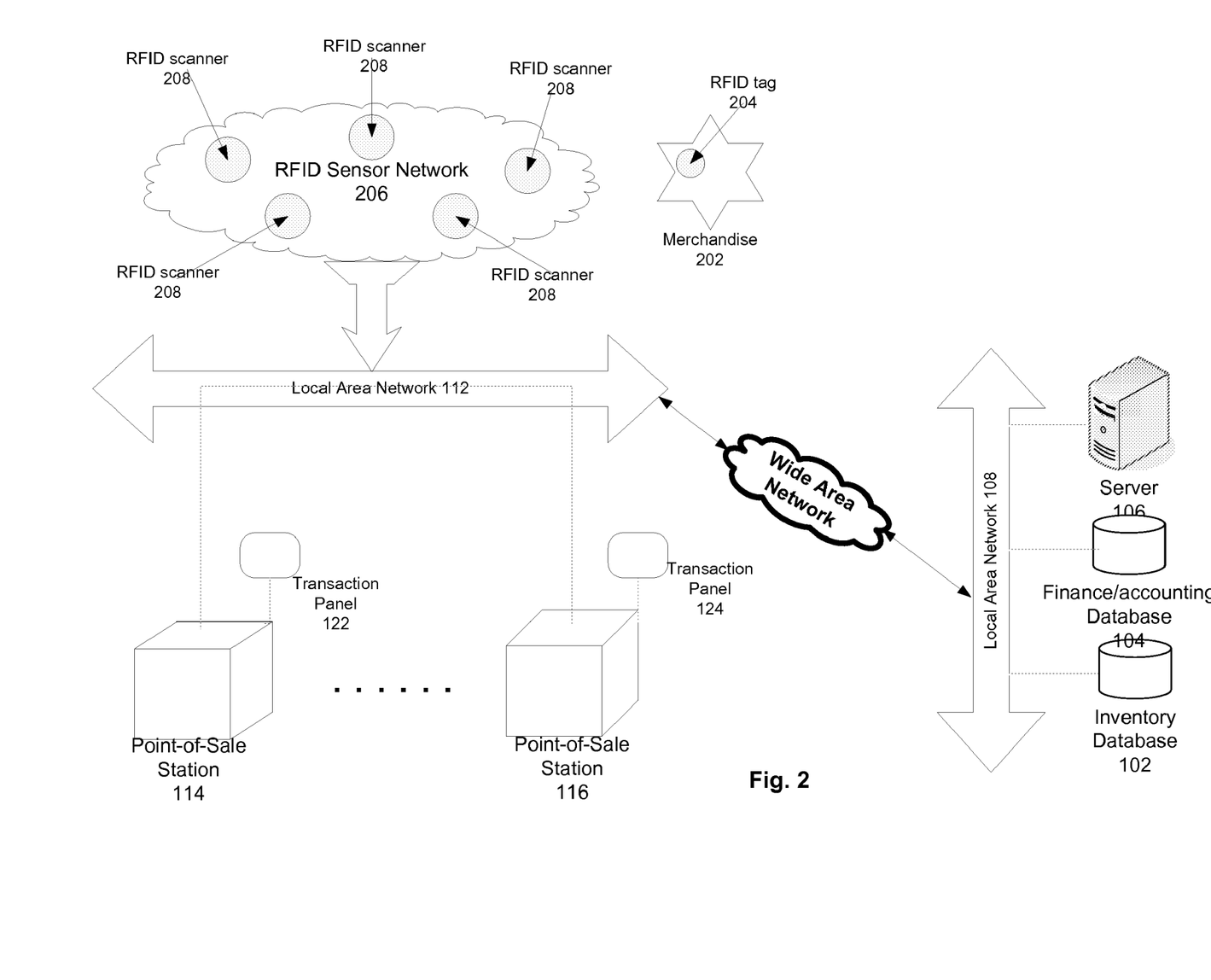
FIG. 2 shows an example RFID POS system according to one example embodiment of the present invention.

Unlike a barcode scanner that requires directional hand-held scanning at close range, an RFID scanner, e.g., a Gen-2 scanner, may read an RFID tag from a relatively far distance, e.g., 3 to 5 meters away. Referring to FIG. 2, according to one example embodiment of the present invention, merchandise 202 with a unique RFID tag 204 may be scanned by RFID scanners 208 in an RFID sensor network 206. In a similar manner to a barcode transaction, the identification of the product, e.g., the RFID tag identification, may be transmitted through LAN 112, 108 and WAN 110 to the server 106 which may cause the transaction to be recorded and the corresponding databases 102, 104 to be updated.

According to one example embodiment of the present invention, an RFID sensor network may be arranged to be an integrated part of a POS station as a streamlined customer checkout counter. A pathway leading to the POS station and a conveyor commonly connected to a checkout POS station may be configured with RFID scanners. In one example embodiment, the RFID sensors may be arranged in a line on the edges of the pathway or the conveyor so that the RFID sensors may automatically read the RFID tag identifications of merchandise that a customer may want to purchase. In one example embodiment of the present invention, the RFID sensor array along the pathway may detect the RFID tags of bigger items, e.g., a large-screen television, and the RFID sensor array along the conveyor may detect the RFID tags of smaller items. In this way, the manual scanning of barcodes by a cashier may be replaced by the RFID tag scanning. All items scanned by the RFID sensor arrays may be identified and listed on a transaction panel for a cashier to confirm and complete the purchase transaction.

According to one example embodiment of the present invention, the RFID sensor array may be arranged in a tunnel which may be made of materials with good reflectivity to radio frequency (RF) signals, e.g., metal or alloy. The tunnel may be arranged in front of a checkout POS station so that when a customer may push a shopping cart that contains merchandise attached with RFID tags through the tunnel, or the shopping cart may be pulled through the tunnel automatically by, e.g., a transport device, the RF signals emitted from these tags may be confined and preserved within the tunnel, and detected by the RFID sensor array. All items detected by the RFID sensor array may be identified and listed on a transaction panel as a pending order for a cashier to confirm and complete the purchase transaction.

According to one example embodiment of the present invention, a shopping cart may be arranged to include an RF antenna and an RFID tag scanner, or the shopping cart may be constructed such that it functions as an RF antenna. A customer may scan each item with the RFID scanner as the customer places each item in the cart. This may cause each scanned item to be included as part of a transaction. The cart can therefore track all of the scanned items and may transmit the collected data to a POS station at checkout.

According to one example embodiment of the present invention, an external sensor array may be arranged along with an RFID sensor array which may detect items passed through. In one example embodiment, a laser net may form a laser plane for detecting an item as it passes through so that a verification of an RFID read can occur. If the laser net detects an item that is not detected by the RFID readers, the system may notify a cashier for a visual inspection, or in certain situations, inform the cashier to perform a barcode scan on the product.

According to one embodiment of the present invention, a checkout system may be implemented in two steps. The first step may include the identification of items for purchase by a customer at one or more centralized RFID areas in a store. Items may be identified by scanning RFID tags attached to each of the items. In one example embodiment of the present invention, a customer may put items on a shopping cart and push through the centralized RFID area for an identification of these items. The items in the cart may also be identified throughout the shopping process. Additionally, the cart may be attached with a unique cart RFID tag that may allow the items in the cart to be associated with the unique cart RFID tag using RFID readings of the cart RFID tag, including signal strength, number of tag reads, etc. The items identified by any of the centralized RFID areas may then be stored in an RFID inventory database associated with the cart identification as a part of a pending transaction. A pending transaction for the items in a shopping cart may be associated with the cart and retrieved later using the tag identification of the cart.

Once an item has been detected and identified by an RFID scanner, a second step of the checkout process may be conducted at a later time. Specifically, the items may be moved to one of a plurality of POS stations for a customer to complete a customer checkout. The pending transaction may be retrieved at a POS station based upon an identification of the cart, which may be the same as the one previously used to associate the transaction with the products that have been placed in the cart. Checkout may then be performed using any number of techniques including self-checkout or by a cashier.

DETAILED DESCRIPTION OF EXAMPLE EMBODIMENTS

FIG. 2 shows an example RFID POS system according to one example embodiment of the present invention. In one example embodiment of the present invention, an RFID sensor network 206 may replace the barcode scanning. The RFID sensor network 206 may include RFID scanners 208 that may be set up at different areas of the store and may be capable of detecting an RFID tag identification and transmit the identification to a LAN 112 connected to an inventory database 102. A customer may bring merchandise 202 labeled with an RFID tag 204 that uniquely identifies the merchandise 202 to the RFID sensor network 206. Scanners 208 in the RFID sensor network may automatically detect the RFID tag identifications of the merchandise and transmit the identifications to the server computer 106. The server computer 106 may place the merchandise in a list of pending purchase merchandise and cause a display of the list at a transaction panel 122. The customer may complete the transaction by paying for the merchandise at the POS station 114. In this way, the barcode scanning step of a customer checkout may be replaced with a simple confirmation by the cashier.

In one embodiment of the present invention, the RFID tags may be manually associated with merchandise by labeling RFID tags to the merchandise and recording the RFID tags in the inventory database. In an alternative embodiment of the present invention, RFID tags may be associated with merchandise using an existing barcode system. An RFID tag scanner may be embedded in a flatbed barcode scanner (not shown). The combined RFID tag scanner and barcode scanner may be located at a POS station. The combined RFID tag and barcode scanner may read information stored in a barcode associated with the merchandise and/or read information in the RFID tag associated with the merchandise at the same time. In this way, the POS transaction may be validated such that any over- or under-charges may be avoided by notifying the cashier when a product barcode scan is missing.

Figure 3:
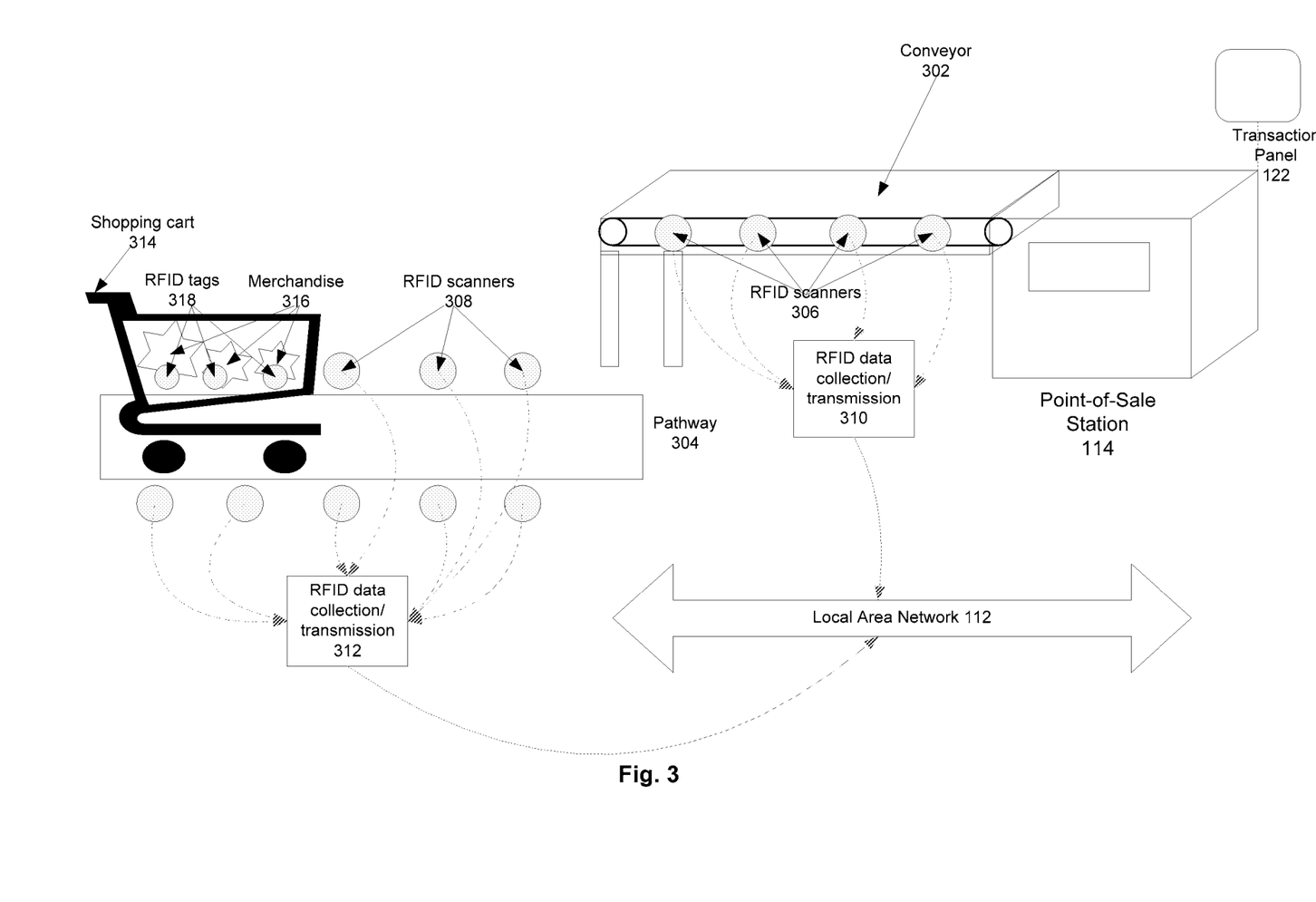
FIG. 3 shows an example RFID POS station according to one example embodiment of the present invention.

FIG. 3 shows an example RFID POS station according to one example embodiment of the present invention. A POS station 114 may include a conveyor 302 for transporting small items that a customer wants to purchase to a counter of the POS station. A pathway 304 for a shopping cart 314 may lead to the POS station. In one example embodiment of the present invention, the conveyor 302 and the pathway 304 may be configured with RFID scanners 306, 308 for automatically detecting RFID tags 318 associated with merchandise 316. In one embodiment of the present invention, RFID scanners 306 may be embedded under a surface of the conveyor 302 so that when small merchandise items are transported through the conveyor belt, RFID tags associated with the small merchandise items may be detected automatically. The pathway 304 may be configured with RFID scanners 308 to detect large merchandise items. When a customer pushes a shopping cart 314 onto the pathway 304, large merchandise items may be detected by RFID scanners 308.

In one embodiment of the present invention, RFID scanners 306, 308 may first transmit the information of detected RFID tags to RFID data collection and transmission boxes 310, 312 which may in turn transmit the information to the LAN 112. The server computer 106 (not shown) may generate a list of pending purchase orders based on the RFID tag information received and cause the orders to be displayed at the transaction panel 122. A cashier or the customer may then complete the transaction at the transaction panel 122.

In one embodiment of the present invention, the customer may place merchandise with RFID tags in a bag (not shown), e.g., a grocery bag. When the bag is placed on, e.g., the conveyor 302, merchandise items with RFID tags in the bag may be detected by the RFID scanners 306. The number of merchandise items may be displayed at the transaction panel 122. A cashier may verify the accuracy of the RFID scan by simply counting the number of merchandise items in the bag.

Figure 4:
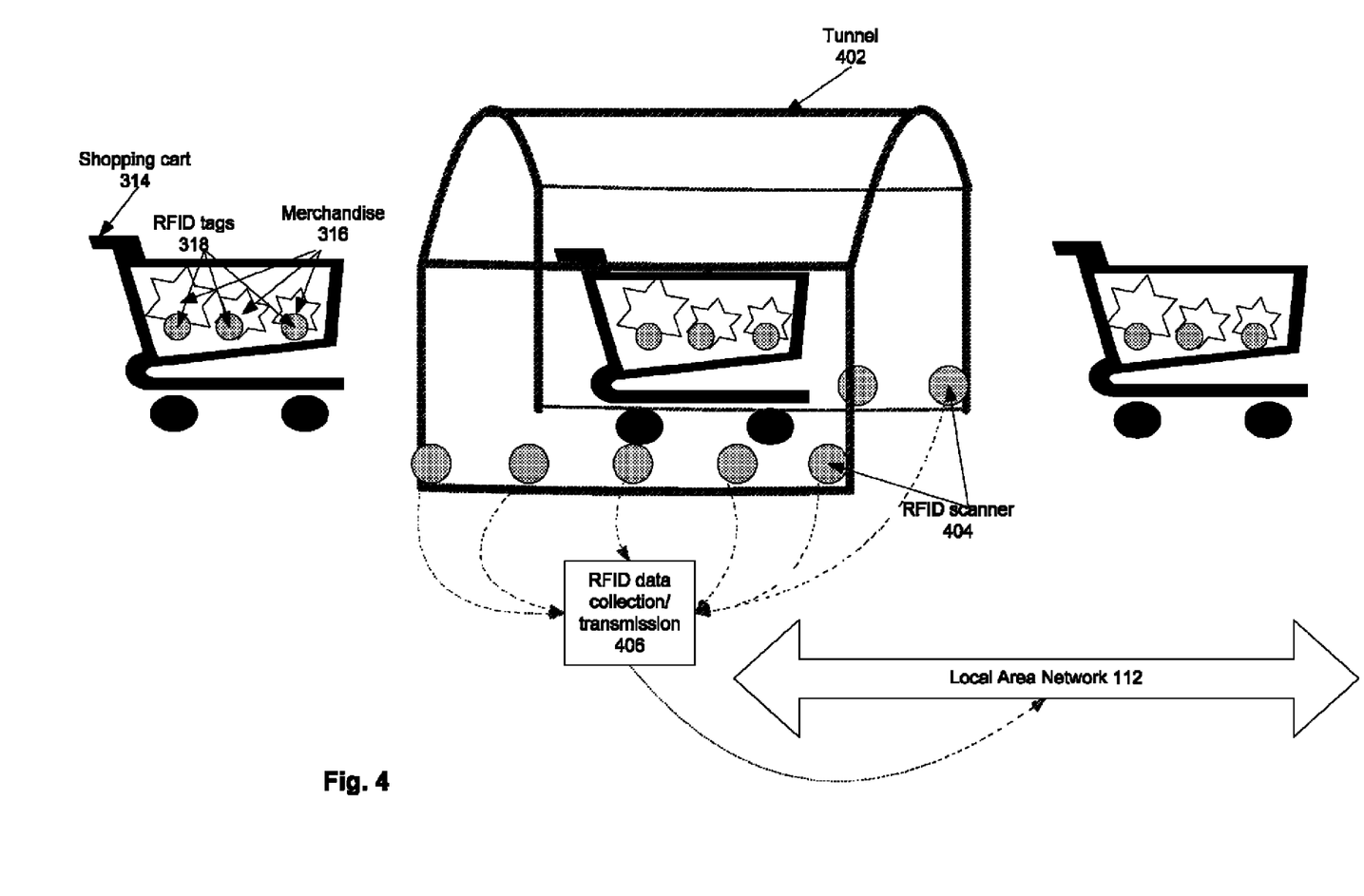
FIG. 4 shows an example RFID sensor network in a tunnel according to one example embodiment of the present invention.

FIG. 4 shows an example RFID sensor network in a tunnel according to one example embodiment of the present invention. A tunnel 402 located at, e.g., a pathway toward a POS station may include a plurality of RFID scanners 404 on an inside surface of the tunnel. These RFID scanners may be oriented inward to the center of the tunnel so that when a customer pushes a shopping cart 314 through the tunnel, or the cart is pulled through the tunnel automatically by, e.g., a conveyor belt, the RFID scanners 404 may detect the RFID tags 318 associated with merchandise 316. The inside surface of the tunnel 402 may be made of materials that are reflective to radio frequency (RF) signals. In this way, the RF energy may be confined within the tunnel for improved RFID tag readings.

As discussed above in FIG. 3, an RFID data collection and transmission box 406 may collect RFID tag information and transmit it to a server computer 106 (not shown) through a LAN 112. The server may generate a list of pending orders based on the RFID tag information received and cause the orders to be displayed at the transaction panel 122 (not shown). A cashier may verify the accuracy of the RFID scan by simply counting the number of merchandise items.

Figure 5:
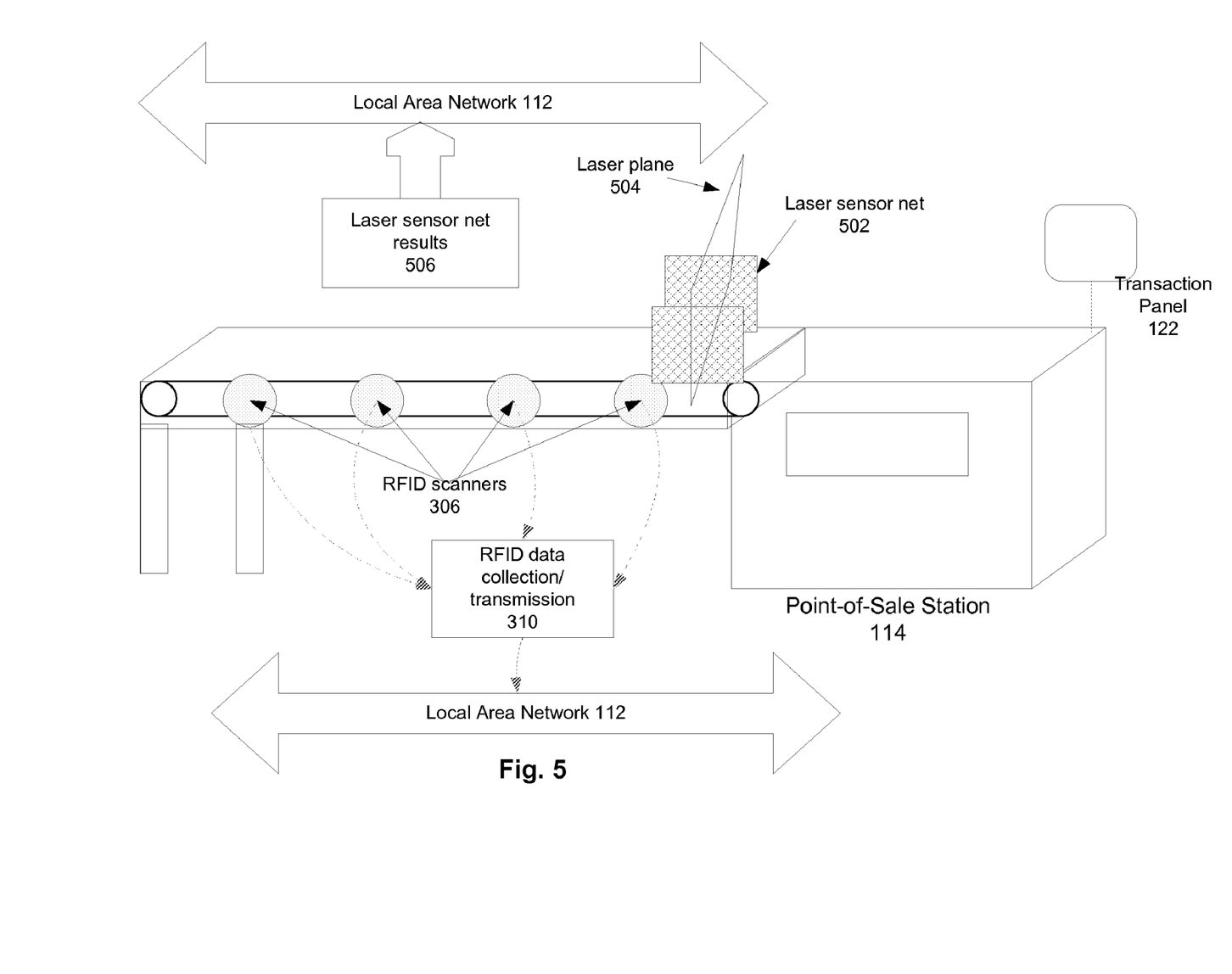
FIG. 5 shows an example RFID POS station equipped with a laser sensor net according to one example embodiment of the present invention.

FIG. 5 shows an example RFID POS station equipped with a laser sensor net according to one example embodiment of the present invention. An external sensor network (other than the RFID sensor network), e.g., laser sensor network, proximity sensor network, or any type of sensors that may be capable of detecting a passing object, may automatically detect a merchandise item as a verification of the RFID tag scan. According to one example embodiment of the present invention, laser sensors 502 including a laser emitter and detector (not shown) may be placed along sides of the conveyor. A laser beam emitted from the laser emitter may form a laser plane 504 so that each item that passes through the laser plane may be detected and counted. The detection results from the laser sensor net 504 in correlation with the information from the RFID tag detection may be transmitted to the server computer 106 (not shown). The server computer may generate a list of pending orders based on the RFID tag information received and cause the orders to be displayed at the transaction panel 122 (not shown). In this way, the laser sensor net may replace the need for a cashier's verification of the number of items sold. In an alternative embodiment of the present invention, the external sensor network may detect a passing item and trigger the RFID scanner for an RFID scan. If the RFID scan detects an item, the item may be placed in a list of pending purchases. Otherwise, a cashier is noticed for further inspection of the item or performing a barcode scan on the product.

Figure 6:
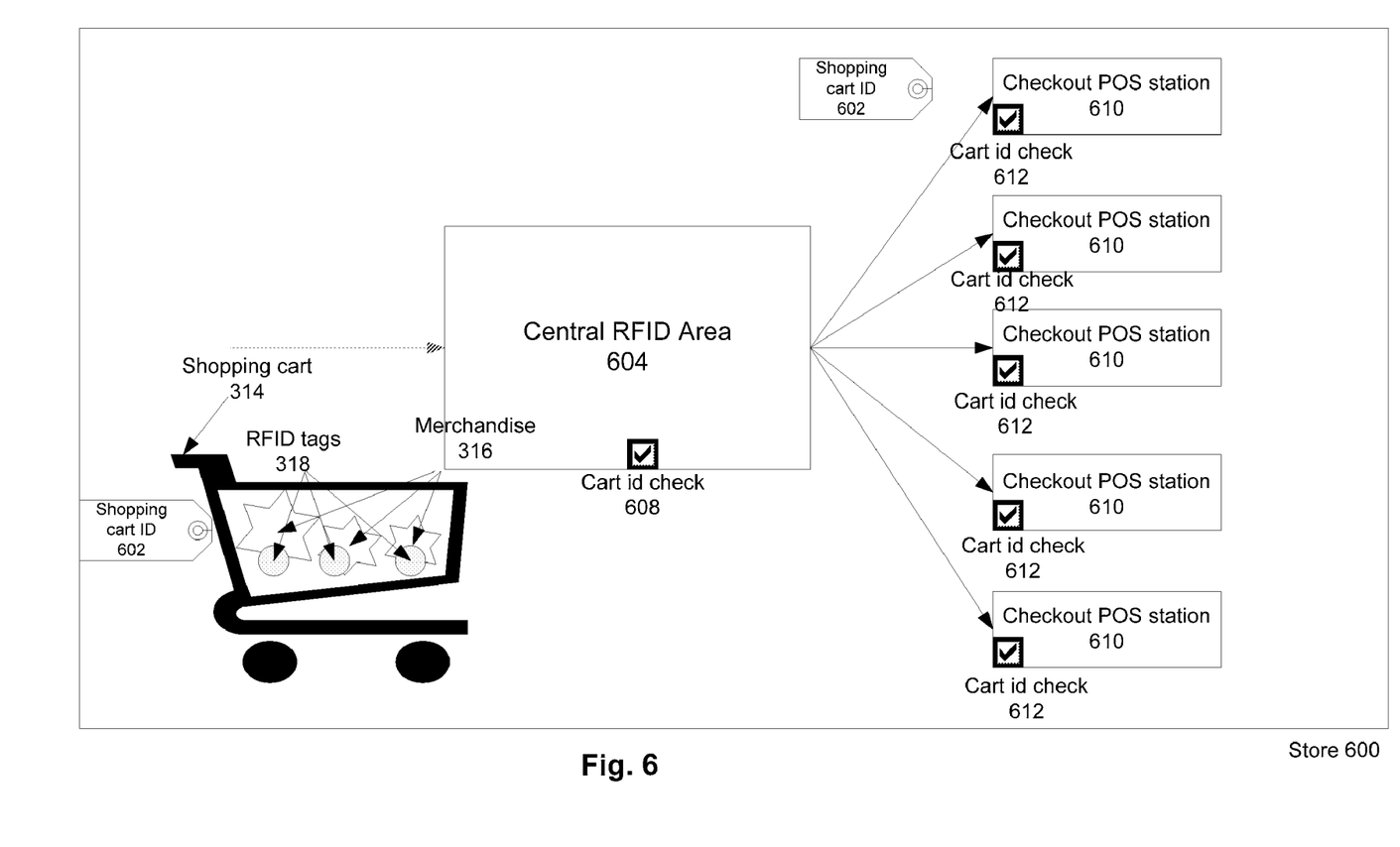
FIG. 6 shows an example integrated system of a two-step RFID POS checkout with a central RFID area according to one example embodiment of the present invention.

FIG. 6 shows an example integrated system of a two-step RFID POS checkout with a central RFID area according to one example embodiment of the present invention. A store 600 may include one or more central RFID areas 604 which may be located at any part of the store. A central RFID area 604 may include a plurality of RFID scanners (not shown) and a device 608 for checking shopping cart identification using, e.g., a cart RFID tag 602 uniquely associated with a shopping cart. The central RFID area 604 may be constructed in the form of a tunnel as illustrated in FIG. 4 to confine RF signals within the space of the tunnel. A customer may check in at the central RFID area by, e.g., scanning a cart RFID tag 602 at a card reading device 608. The identification of a customer may trigger RFID scanners in the central RFID area to start an RFID tag scanning. The detected RFID tag information along with the customer identification, e.g., via the cart tag, may be transmitted to a server computer 106 (not shown) to be stored in the inventory database (not shown) as a pending purchase order for the customer.

In one embodiment of the present invention, each of checkout POS stations 610 may also include a device 612 for customer identification, e.g., using the cart RFID tag. The customer may identify himself at the checkout POS station to cause the server computer 106 to retrieve the pending purchase orders previously generated for the customer from the inventory database. The pending purchase orders may then be displayed at a transaction panel for the customer or a cashier to complete the purchase.

Figure 7:
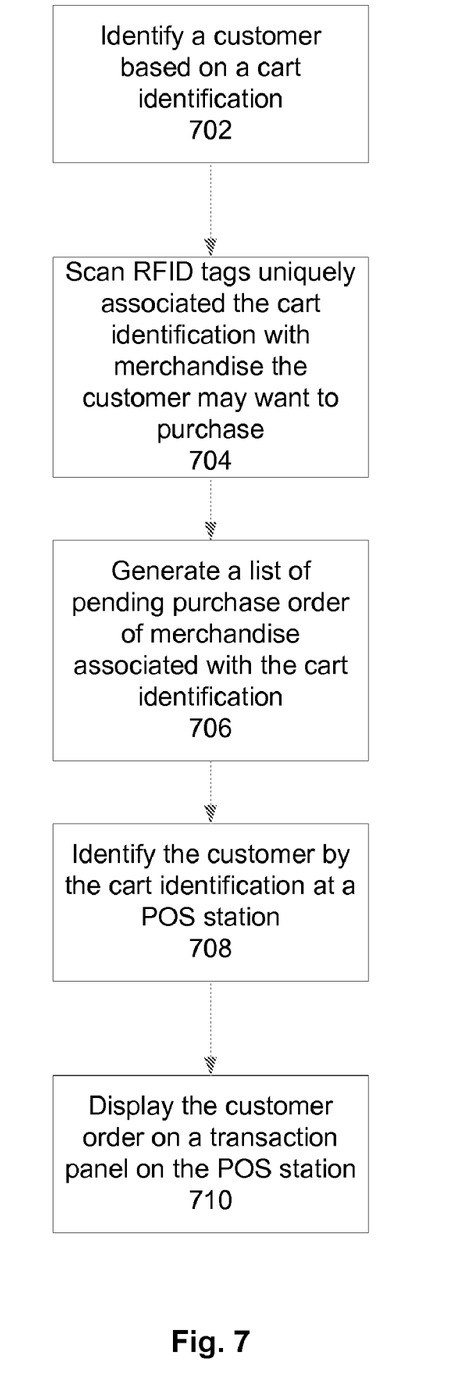
FIG. 7 shows an example method of the two-step RFID POS checkout with one or more central RFID areas according to one example embodiment of the present invention.

FIG. 7 shows an example method of the two-step RFID POS checkout with one or more central RFID areas according to one example embodiment of the present invention. At 702, the shopping cart may be identified based upon a unique cart RFID tag read. In response to the cart identification, at 704, a plurality of RFID scanners may be triggered for scanning RFID tags that are uniquely associated with merchandise that has been placed in the cart for future purchase. The RFID scanners may send the information of scanned RFID tags including the cart tag and product tags to a server computer for generating a list of pending purchase orders of merchandise associated with the shopping cart identification 706. The server computer may cause the list of pending purchase orders of merchandise to be stored in an inventory database. At a POS station, the shopping cart unique RFID tag may be read by the POS station 708. In response to this identification of the customer via the cart RFID tag, the POS station may send shopping cart identification to the server computer and cause the server computer to retrieve the previously stored list of pending purchase orders of merchandise associated with the shopping cart from the inventory database. The pending orders may then be displayed on a transaction panel 710 for the customer or a cashier to complete the purchase transaction.

Those skilled in the art may appreciate from the foregoing description that the present invention may be implemented in a variety of forms, and that the various embodiments may be implemented alone or in combination. Therefore, while the embodiments of the present invention have been described in connection with particular examples thereof, the true scope of the embodiments and/or methods of the present invention should not be so limited since other modifications will become apparent to the skilled practitioner upon a study of the drawings, specification, and following claims.

What is claimed is:

1. An RFID Point-of-Sale (POS) station for completing a sale transaction to a customer of a plurality of items associated with a plurality of unique RFID tags at a store, comprising:
   an arrangement of a plurality of RFID tag scanners for detecting the plurality of unique RFID tags associated with the plurality of items; and
   a checkout platform including a transaction panel, wherein a list of the plurality of items is displayed on the transaction panel based on a matching of the detected plurality of unique RFID tags with information stored in an inventory database,
   wherein the arrangement includes a plurality of external sensors other than the plurality of RFID scanners, the plurality external sensors being capable of detecting a number of the plurality of items, and the detection of one of the plurality of items by the external sensors provides a trigger to the plurality of RFID scanners.

2. The station of claim 1, wherein the arrangement includes at least one of a conveyor and a pathway, the at least one of the conveyor and the pathway being configured with the plurality of RFID tag scanners.

3. The station of claim 2, wherein the conveyor is embedded with the plurality of RFID tag scanners under a surface of the conveyor.

4. The station of claim 2, wherein the the at least one of the conveyor and the pathway is configured with the plurality of RFID tag scanners along at least one edge of the each of the conveyor and the pathway.

5. The station of claim 1, wherein the arrangement includes a tunnel configured with the plurality of RFID scanners inside the tunnel.

6. The station of claim 5, wherein an inside surface of the tunnel is made of a material that confines radio frequency signals emitted from the plurality of unique RFID tags associated with the plurality of items within the tunnel.

7. The station of claim 5, wherein an inside surface of the tunnel is made of materials that are reflective to RF signals emitted from the plurality of unique RFID tags.

8. The station of claim 5, wherein an inside surface of the tunnel is made of a metallic material.

9. The station of claim 5, wherein the tunnel is wide enough to allow the customer to push a shopping cart through.

10. The station of claim 1, wherein the plurality of RFID scanners are linked to the inventory database through a local area network (LAN).

11. The station of claim 1, wherein the number of the plurality of items detected by the plurality of external sensors is compared to the list of the plurality of items detected by the plurality of RFID scanners for a determination of whether the number of the plurality of items detected by the plurality of external sensors is compared to the list of the plurality of items detected by the plurality of RFID scanners for a determination of whether the number of the plurality of items detected by the plurality of external sensors matches the list of items detected by the plurality of RFID scanners.

12. The station of claim 1, wherein the plurality of external sensors are configured along a side of at least one of a conveyor and a pathway.

13. An RFID Point-of-Sale (POS) station for completing a sale transaction to a customer of a plurality of items associated with a plurality of unique RFID tags at a store, comprising:
   an arrangement of a plurality of RFID tag scanners for detecting the plurality of unique RFID tags associated with the plurality of items; and
   a checkout platform including a transaction panel, wherein a list of the plurality of items is displayed on the transaction panel based on a matching of the detected plurality of unique RFID tags with information stored in an inventory database, wherein the arrangement includes a plurality of external sensors other than the plurality of RFID scanners, the plurality of external sensors being capable of detecting a number of the plurality of items, and the plurality of external sensors include laser sensors for forming a laser beam plane.

14. The station of claim 13, wherein the arrangement includes at least one of a conveyor and a pathway, the at least one of the conveyor and the pathway being configured with the plurality of RFID tag scanners.

15. The station of claim 14, wherein the conveyor is embedded with the plurality of RFID tag scanners under a surface of the conveyor.

16. The station of claim 14, wherein the at least one of the conveyor and the pathway is configured with the plurality of RFID tag scanners along at least one edge of the each of the conveyor and the pathway.

17. The station of claim 13, wherein the arrangement includes a tunnel configured with the plurality of RFID scanners inside the tunnel.

18. The station of claim 17, wherein an inside surface of the tunnel is made of a material that confines radio frequency signals emitted from the plurality of unique RFID tags associated with the plurality of items within the tunnel.

19. The station of claim 17, wherein an inside surface of the tunnel is made of materials that are reflective to RF signals emitted from the plurality of unique RFID tags.

20. The station of claim 17, wherein an inside surface of the tunnel is made of a metallic material.

21. The station of claim 17, wherein the tunnel is wide enough to allow the customer to push a shopping cart through.

22. The station of claim 13, wherein the plurality of RFID scanners are linked to the inventory database through a local area network (LAN).

23. The station of claim 13, wherein the number of the plurality of items detected by the plurality of external sensors is compared to the list of the plurality of items detected by the plurality of RFID scanners for a determination of whether the number of the plurality of items detected by the plurality of external sensors matches the list of items detected by the plurality of RFID scanners.

24. The station of claim 13, wherein the plurality of external sensors are configured along a side of at least one of a conveyor and a pathway.

25. An integrated RFID Point-of-Sale (POS) system for completing a sale transaction to a customer of a plurality of items associated with a plurality of unique RFID tags at a store, comprising:
   an RFID enabled area in the store arranged with a plurality of RFID scanners for detecting the plurality of unique RFID tags associated with the plurality of items;
   a customer identification device for identifying the customer to the integrated RFID POS system; and
   a checkout platform including a transaction panel, wherein a customer-specific list of the plurality of items is displayed on the transaction panel based on a matching of the detected plurality of unique RFID tags with information stored in an inventory database and the customer identification, wherein the RFID enabled area includes suspended RFID scanners on a ceiling of the store.

26. The system of claim 25, wherein the RFID enabled area is located separately from the checkout platform.

27. The system of claim 25, wherein the customer is identified via an RFID tag associated with a shopping cart.

28. A method for completing a sale transaction to a customer of a plurality of items associated with a plurality of unique RFID tags at a Point-of-Sale station in a store, comprising:
   providing an RFID enabled area in the store arranged with a plurality of RFID scanners for detecting the plurality of unique RFID tags associated with the plurality of items;
   in response to a first identification of the customer, triggering the plurality of RFID scanners for detecting the plurality of unique RFID tags associated with the plurality of items and store information associated with the plurality of unique RFID tags in an inventory database; and
   providing a checkout platform including a transaction panel, wherein in response to a second identification of the customer, a customer-specific list of the plurality of items is retrieved from the inventory database and is displayed on the transaction panel based on a matching of the detected plurality of unique RFID tags with information stored in the inventory database and the customer identification.

* * * * *